United States Patent
Han et al.

(10) Patent No.: US 9,102,543 B2
(45) Date of Patent: Aug. 11, 2015

(54) METHOD OF FABRICATING SILICON CARBIDE

(75) Inventors: Jung Eun Han, Seoul (KR); Byung Sook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/236,813

(22) PCT Filed: Aug. 1, 2012

(86) PCT No.: PCT/KR2012/006123
§ 371 (c)(1),
(2), (4) Date: Feb. 4, 2014

(87) PCT Pub. No.: WO2013/019068
PCT Pub. Date: Feb. 7, 2013

(65) Prior Publication Data
US 2014/0178285 A1   Jun. 26, 2014

(30) Foreign Application Priority Data
Aug. 1, 2011   (KR) .................. 10-2011-0076752

(51) Int. Cl.
*C01B 31/36*   (2006.01)

(52) U.S. Cl.
CPC ......... *C01B 31/36* (2013.01); *C04B 2235/3826* (2013.01)

(58) Field of Classification Search
None
See application file for complete search history.

(56) References Cited

U.S. PATENT DOCUMENTS 7,150,850 B2 * 12/2006 Odaka ........................ 264/682

FOREIGN PATENT DOCUMENTS

KR   10-2011-0021530 A *  3/2011
WO   WO 2011025285 A2 *  3/2011

* cited by examiner

*Primary Examiner* — Guinever Gregorio
(74) *Attorney, Agent, or Firm* — Saliwanchik, Lloyd & Eisenschenk

(57) ABSTRACT

A method of fabricating silicon carbide according to the embodiment comprises the steps of preparing a mixture by mixing a dry silicon source with a carbon source comprising an organic carbon compound; and reacting the mixture, wherein a viscosity of the carbon source is in a range of 20 cps to 1000 cps.

9 Claims, 1 Drawing Sheet

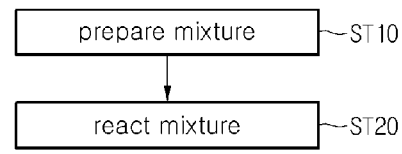

METHOD OF FABRICATING SILICON CARBIDE

CROSS-REFERENCE TO RELATED APPLICATIONS

This application is the U.S. national stage application of International Patent Application No. PCT/KR2012/006123, filed Aug. 1, 2012, which claims priority to Korean Application No. 10-2011-0076752, filed Aug. 1, 2011, the disclosures of each of which are incorporated herein by reference in their entirety.

TECHNICAL FIELD

The embodiment relates to a method of fabricating silicon carbide.

BACKGROUND ART

Recently, silicon carbide has been used in various electronic devices as a semi-conductor material for various purposes. In particular, the silicon carbide is very useful because the silicon carbide has the superior physical strength and high resistance against the chemical attack. In addition, the silicon carbide represents the superior electronic characteristics, such as the high radiation hardness, high breakdown filed, relatively wide bandgap, high saturated electron drift velocity, high operating temperature, and high absorption and emission of quantum energy in the blue, violet and ultraviolet bands of a spectrum.

The silicon carbide can be fabricated by mixing and heating source materials, such as a silicon source and a carbon source. Generally, in fabrication of the silicon carbide, a solid-phase raw material is input into a crucible and synthesized in the crucible. A silicon carbide powder may be scattered due to reaction gas generated during a synthesis reaction, for example, CO gas. Particularly, the silicon carbide powder may be frequently scattered due to reaction gas during reaction caused by the small grain size of the silicon carbide powder. The scattering may reduce the recovery rate of the silicon carbide powder.

A conventional scheme for fabricating the silicon carbide powder uses an Acheson scheme, a carbon-thermal reduction scheme, a liquid polymer thermal decomposition scheme, and a CVD (Chemical Vapor Deposition) scheme. In particular, the liquid polymer thermal decomposition scheme or the carbon-thermal reduction scheme is used for synthesizing a high purity silicon carbide powder.

That is, a silicon source is mixed with a carbon source, and the carbonization process and the synthesis process on the mixture are performed to synthesize silicon carbide.

A reaction formula of the silicon carbide powder is as follows.

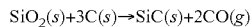

$SiO_2(s)+3C(s) \rightarrow SiC(s)+2CO(g)$

For example, the Acheson scheme is a representative scheme of synthesizing the silicon carbide. The Acheson scheme is a scheme which fabricates silicon carbide by mixing a silicon source with a carbon source, and applying an electric current through the mixture to be reacted at the high temperature in the range of about 2200° C. to 2400° C.

Further, a CVD synthesis scheme synthesizes silicon carbide by reacting gas containing silicon and carbon. The CVD synthesis comprises a thermal decomposition CVD scheme and a plasma CVD scheme. In this case, $SiCl_2$ gas or $SiH_2$ gas may be used as the silicon source, and $CH_4$ gas, $C_3H_4$ gas, or $CCl_4$ gas may be used as the carbon source.

Further, the liquid polymer thermal decomposition scheme or the carbon-thermal reduction scheme is used for synthesizing a high-purity fine carbon silicon powder at a low temperature, and the high-purity fine carbon silicon powder is fabricated using ethyl silicate and phenol resin as a carbon source and a silicon source.

In this case, a method of mixing the carbon source with the silicon source may be classified into a dry mixing process and a wet mixing process.

In the dry mixing process, a carbon source is mixed with a silicon source and the mixture is synthesized without a carbonization process to synthesize a silicon carbide.

Meanwhile, in the wet mixing process, a carbon source is mixed with a silicon source using solvent, and the mixture is dried, and then the carbonization process and the synthesis process on the dried mixture are performed to synthesize a silicon carbide.

However, the dry mixing process has a problem in that a grain size of carbon silicon is non-uniform. In a case of the wet mixing process, a dry process is added and additional facilities are necessary due to the use of the solvent, so the manufacturing cost may be increased.

Accordingly, there is a need for a mixing process capable of making the grain size of synthesized silicon carbide uniform as in the wet mixing process without using the solvent as in the dry mixing process.

DISCLOSURE OF INVENTION

Technical Problem

The embodiment provides a method of fabricating silicon carbide which mixes a silicon source with a dry silicon source by coating the dry silicon source on a carbon source having a viscosity, thereby omitting a drying step required in an existing wet mixing process and making the grain size of a mixture powder uniform.

Solution to Problem

A method of fabricating silicon carbide powder according to the embodiment comprises the steps of preparing a mixture by mixing a dry silicon source with a carbon source comprising an organic carbon compound; and reacting the mixture, wherein a viscosity of the carbon source is in a range of 20 cps to 1000 cps.

Advantageous Effects of Invention

According to the method of fabricating silicon carbide of the embodiment, an organic liquid-phase carbon compound having a predetermined viscosity is mixed with a dry silicon source by coating the organic liquid-phase carbon compound on the dry silicon source, so that mixture powder may be directly fabricated without the solvent.

That is, different from the wet mixing process, the solvent is not used, so a process of drying the solvent may not be necessary. Accordingly, environment equipment required due to the use of the solvent is not necessary, so the manufacturing cost can be reduced.

Moreover, since the uniform grain size of mixing powder is obtained without using the solvent as in the wet mixing process, high-purity and high-density silicon carbide can be fabricated.

Therefore, according to the method of fabricating silicon carbide of the embodiment, a process can be simplified because the solvent is not used and powder having the uniform grain size can be fabricated as in the wet mixing process, so that high-purity and high-density silicon carbide can be fabricated.

BRIEF DESCRIPTION OF DRAWINGS

FIG. 1 is a flowchart showing a method of fabricating silicon carbide according to the embodiment.

MODE FOR THE INVENTION

Hereinafter, a method of fabricating silicon carbide according to the embodiment will be described in detail with reference to accompanying drawings.

FIG. 1 is a flowchart showing a method of fabricating the silicon carbide powder according to the embodiment.

Referring to FIG. 1, the method of fabricating the silicon carbide according to the embodiment comprises the steps of preparing a mixture by mixing a dry silicon source with a carbon source comprising an organic carbon compound (ST10); and reacting the mixture (ST20), wherein a viscosity of the carbon source is in a range of 20 cps to 1000 cps.

Hereinafter, each step of the method will be described in more detail.

In step ST10 of preparing the mixture, the dry silicon (Si) source and the carbon source are prepared and mixed to form a mixture material.

A process of mixing the carbon source with the dry silicon source may be classified into a dry mixing process and a wet mixing process according to the use of solvent. In this case, in the wet mixing process, the carbon source may be conglomerated with the silicon source, so that the productivity can be improved. In addition, according to the dry mixing process, the cost for the solvent can be saved, pollution caused by the solvent can be solved, and the carbonization process can be omitted, so that the process can be simplified.

However, in the wet mixing process, a dry process is performed to remove solvent that will make the process complicated. Further, the dry mixing process has a disadvantage in that a grain size of mixing powder is non-uniform.

Therefore, the method of fabricating silicon carbide according to an embodiment may coat a dry silicon source having silicon with organic liquid-phase carbon compound having predetermined viscosity in a spray scheme to reduce a process step using a dry mixing process and to make a grain size of mixing powder uniform.

That is, the method of fabricating silicon carbide according to the embodiment mixes the carbon source with the dry silicon source using the dry mixing process, so that a drying process required in a wet mixing process may be omitted, thereby simplifying a process and making a grain size of powder uniform.

In this case, the dry silicon source and the carbon source may be mixed with each other by scattering and coating a carbon source of organic liquid-phase carbon compound in a spray scheme.

To coat the carbon source on the dry silicon source through the spray scheme, a viscosity of the carbon source may be in the range of 20 cps to 1000 cps. Preferably, the viscosity of the carbon source may be in the range of 20 cps to 500 cps. More preferably, the viscosity of the carbon source may be in the range of 20 cps to 200 cps.

The silicon source may comprise various materials capable of providing silicon. For example, the silicon source may comprise at least one selected from the group consisting of silica sol, silicon dioxide, fine silica and quartz powder. However, the embodiment is not limited thereto. For instance, organic silicon compound comprising silicon may be used as the carbon source.

The carbon source may comprise the organic carbon compound.

The organic carbon compound may comprise at least one selected from the group consisting of phenol resin, franc resin, xylene resin, polyimide, polyurethane, poly-acrylonitrile, polyvinyl alcohol and cellulose.

The dry silicon source and the carbon source can be mixed by using a device comprising an impeller while controlling impeller speed and time. In this case, the dry silicon source and the carbon source may be mixed with each other in such a way that the carbon source is sprayed and coated on the dry silicon source to recover mixing powder. In this case, a mixed material is in a powder state, so a drying process is not necessary.

The dry silicon source and the carbon source can be mixed in a predetermined mass ratio. For instance, a mole ratio of carbon comprised in the carbon source to silicon comprised in the dry silicon source (hereinafter, referred to as mole ratio of carbon to silicon) is in the range of about 1:1.5 to about 1:3. If the mole ratio of carbon to silicon exceeds 3, the amount of carbon is so excessive that the amount of residual carbon, which does not participate in the reaction, is increased, lowering the recovery rate. In addition, if the mole ratio of carbon to silicon is less than 1.5, the amount of silicon is so excessive that the amount of residual silicon, which does not participate in the reaction, is increased, lowering the recovery rate. That is, the mole ratio of carbon to silicon must be determined by taking the recovery rate into consideration.

Since the dry silicon source is volatilized into a gas phase at the high temperature during the reaction, the mole ratio of carbon to silicon is set in the range of about 1.8 to about 2.7.

The dry silicon source is uniformly mixed with the carbon source to form the mixture.

In step ST20 of reacting the mixture, the mixture is subject to the reaction to form the silicon carbide. In detail, mixture powder is weighed in a graphite crucible and then the mixture powder is supplied and heated in a high-temperature reaction furnace, such as a graphite furnace. The process to form the silicon carbide may be classified into the carbonization process and the synthesis process.

In the carbonization process, the organic carbon compound is carbonized so that carbon is produced. The carbonization process is performed at the temperature in the range of about 600° C. to about 1200° C. In detail, the carbonization process is performed at the temperature in the range of about 800° C. to about 1100° C.

After that, the synthesis process is performed. In the synthesis process, the dry silicon source is reacted with the solid carbon source or the organic carbon compound, so that the dry silicon carbide is formed through following reaction formulas 1 to 3.

$$SiO_2(s)+C(s) \rightarrow SiO(g)+CO(g) \quad \text{[Reaction formula 1]}$$

$$SiO(g)+2C(s) \rightarrow SiC(s)+CO(g) \quad \text{[Reaction formula 2]}$$

$$SiO_2(s)+3C(s) \rightarrow SiC(s)+2CO(g) \quad \text{[Reaction formula 3]}$$

In order to facilitate the above reaction, the heating temperature is set to 1300° C. or above. If the heating temperature is set in the range of 1300° C. to 1900° C., the fabricated silicon carbide may have the β type, which is the low-temperature stable phase. The silicon carbide having the β type consists of fine particles, so the strength of the silicon carbide can be improved. However, the embodiment is not limited thereto. For instance, if the heating temperature exceeds 1800° C., the silicon carbide may have the α type, which is the high-temperature stable phase. The synthesis process may be performed for about 1 hour to about 7 hours.

Hereinafter, the method of fabricating the silicon carbide powder according to the embodiments and comparative example will be described in more detail. The following embodiments are illustrative purpose only and the disclosure is not limited to the embodiments.

Manufacture Example 1

About 1 g of fumed silica and about 1.2 g of phenol resin were mixed to prepare mixture 1. At this time, the average grain size of the fumed silica was about 30 nm and the residual rate of carbon and the viscosity in the phenol resin after the carbonization process were about 60% and 500 cps, respectively. In addition, about 6 kg of the source material was input in the crucible of 500ϕ×100 H.

A device equipped with an impeller was used as a mixing device and the mixing device was operated for 30 minutes at impeller speed of 2000 rpm to mix fumed silica and phenol resin.

After that, the mixture 1 was subject to the carbonization process at the temperature of about 850° C. for five hours while rising the temperature at the rate of 3° C./min and then subject to the synthesis process at the temperature of about 1700° C. for three hours while rising the temperature at the rate of 5° C./min, thereby forming silicon carbide powder 1.

The reaction was started at the initial vacuum degree of 5×10-2 Torr or less and continued by operating a rotary pump.

Comparative Example 1

About 1 g of fumed silica and about 1.2 g of phenol resin were mixed to prepare mixture 2. At this time, the average grain size of the fumed silica was about 30 nm and the residual rate of carbon and the viscosity in the phenol resin after the carbonization process was about 60%, alcohol was used as solvent. The amount of solvent was 1.5 times more than the raw material mixing powder in a volume ratio and mixed by using a ball mill for twenty four hours. Solvent is removed from a mixture slurry using a spray dryer and then about 6 kg of the source material was input in the crucible of 500ϕ×100 H.

After that, the mixture 2 was subject to the carbonization process at the temperature of about 850° C. for five hours while rising the temperature at the rate of 3° C./min and then subject to the synthesis process at the temperature of about 1700° C. for three hours while rising the temperature at the rate of 5° C./min, thereby forming silicon carbide 2.

The reaction was started at the initial vacuum degree of 5×10-2 Torr or less and continued by operating a rotary pump.

Comparative Example 2

At this time, the average grain size of the fumed silica was about 30 nm, the average grain size of the carbon powder was about 30 nm, and the fumed silica and the phenol resin are mixed with each other by using a ball mill for twenty four hours. The mixed powder is separated from a ball through a sieve, and about 6 kg of the source material was input in the crucible of 500ϕ×100 H.

After that, the mixture 3 was subject to the synthesis process at the temperature of about 1700° C. for three hours while rising the temperature at the rate of 5° C./min, thereby forming silicon carbide 3.

The reaction was started at the initial vacuum degree of 5×10-2 Torr or less and continued by operating a rotary pump.

SEM photographs of silicon carbides fabricated according to the manufacture 1, and the comparative examples 1 and 2 are observed.

Referring to SEM photographs, because particles of mixture powder are conglomerated, the particles of the mixture powder are non-uniform.

Meanwhile, referring to SEM photographs, it will be appreciated that the silicon carbide fabricated according the manufacture 1 may reduce conglomeration of the particles of the mixture powder like the silicon carbide fabricated using a wet mixing process and the silicon carbide is formed to have the uniform grain size.

That is, in the method of fabricating silicon carbide according to the embodiment, the dry silicon source and the carbon source are mixed with each other by coating the carbon source having a viscosity on the dry silicon source, so that a drying process required in the wet mixing process may be omitted. Further the silicon carbon fabricated according to the embodiment may reduce conglomerated particles like the silicon carbide fabricated using a wet mixing process, so that the grain size of the silicon carbide may become non-uniform.

Therefore, in the method of fabricating silicon carbide according to the embodiment, a drying process may be omitted as in the dry mixing process and conglomeration of the silicon carbide may be reduced as in the wet mixing process.

Any reference in this specification to "one embodiment," "an embodiment," "example embodiment," etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of fabricating silicon carbide, the method comprising:
   preparing a mixture by mixing a dry silicon source with a carbon source comprising an organic liquid-phase carbon compound; and
   reacting the mixture,
   wherein the preparing of the mixture is achieved by spray-coating the carbon source on the dry silicon source,
   wherein the mixture is obtained without using a solvent,
   wherein a viscosity of the carbon source is in a range of about 20 cps to about 1000 cps.

2. The method of claim 1, wherein the viscosity of the carbon source is in a range of about 20 cps to about 500 cps.

3. The method of claim 1, wherein the viscosity of the carbon source is in a range of about 20 cps to about 200 cps.

4. The method of claim 1, wherein the dry silicon source comprises silica.

5. The method of claim 1, wherein the dry silicon source comprises at least one selected from the group consisting of silica sol, silicon dioxide, fine silica and quartz powder.

6. The method of claim 1, wherein a mole ratio of silicon comprised in the silicon source to carbon comprised in the carbon source is about 1:1.5 to about 1:3.

7. The method of claim 1, wherein the reacting of the mixture comprises a carbonization process and a synthesis process.

8. The method of claim 7, wherein the carbonization process is performed at a temperature in a range of about 800° C. to about 1100° C.

9. The method of claim 7, wherein the synthesis process is performed at a temperature in a range of about 1300° C. to about 1900° C.

\* \* \* \* \*